(12) United States Patent
Goodchild et al.

(10) Patent No.: US 11,469,041 B2
(45) Date of Patent: Oct. 11, 2022

(54) DYNAMIC MULTI-COIL TUNING

(71) Applicant: AIRA, INC., Chandler, AZ (US)

(72) Inventors: Eric Heindel Goodchild, Phoenix, AZ (US); John Winters, Chandler, AZ (US)

(73) Assignee: AIRA, INC., Chandler, AZ (US)

( * ) Notice: Subject to any disclaimer, the term of this patent is extended or adjusted under 35 U.S.C. 154(b) by 173 days.

(21) Appl. No.: 17/140,948

(22) Filed: Jan. 4, 2021

(65) Prior Publication Data

US 2021/0210282 A1  Jul. 8, 2021

Related U.S. Application Data

(60) Provisional application No. 62/957,420, filed on Jan. 6, 2020.

(51) Int. Cl.
*H01F 38/14* (2006.01)
*H02J 50/40* (2016.01)
*H02J 50/12* (2016.01)
*H02J 7/02* (2016.01)

(52) U.S. Cl.
CPC ............. *H01F 38/14* (2013.01); *H02J 7/02* (2013.01); *H02J 50/12* (2016.02); *H02J 50/40* (2016.02)

(58) Field of Classification Search
CPC ... H01F 38/14; H02J 7/02; H02J 50/12; H02J 50/40; H02J 50/402
See application file for complete search history.

(56) References Cited

U.S. PATENT DOCUMENTS

| | | | |
|---|---|---|---|
| 2010/0217553 A1* | 8/2010 | Von Novak | H02J 50/80 702/65 |
| 2014/0070621 A9* | 3/2014 | Von Novak | H02J 50/80 307/104 |
| 2015/0207334 A1* | 7/2015 | Mitcheson | H01F 38/14 307/104 |
| 2016/0134154 A1* | 5/2016 | Baarman | H02J 7/0036 320/108 |
| 2021/0226480 A1* | 7/2021 | Goodchild | G01R 31/2825 |
| 2021/0249879 A1* | 8/2021 | Goodchild | H02J 50/005 |

OTHER PUBLICATIONS

PCT/US2021/012198. International Search Report & Written Opinion (dated Mar. 23, 2021) pp. 10.

* cited by examiner

*Primary Examiner* — Jared Fureman
*Assistant Examiner* — Michael J Warmflash
(74) *Attorney, Agent, or Firm* — Loza & Loza, LLP; Anthony Smyth

(57) ABSTRACT

Systems, methods and apparatus for wireless charging are disclosed. A wireless charging device has a plurality of charging cells provided on a first surface and a processor configured to provide a charging current to a first charging coil in a surface of the wireless charging device, determine that an impedance of a resonant circuit has varied from a threshold or setpoint impedance, and restore the threshold or setpoint impedance by modifying frequency of the charging current. The resonant circuit may include the first charging coil. A method for operating the wireless charging device includes providing a charging current to a first charging coil in a surface of the wireless charging device, determining that an impedance of a resonant circuit has varied from a threshold or setpoint impedance, and restoring the threshold or setpoint impedance by modifying frequency of the charging current. The resonant circuit may include the charging coil.

16 Claims, 14 Drawing Sheets

DYNAMIC MULTI-COIL TUNING

PRIORITY CLAIM

This application claims priority to and the benefit of provisional patent application No. 62/957,420 filed in the United States Patent Office on Jan. 6, 2020, the entire content of this application being incorporated herein by reference as if fully set forth below in their entirety and for all applicable purposes.

TECHNICAL FIELD

The present invention relates generally to wireless charging of batteries, including the use of a multi-coil wireless charging device to charge batteries in mobile devices regardless of location of the mobile devices on a surface of the multi-coil wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for improved charging techniques for multi-coil, multi-device charging pads.

DETAILED DESCRIPTION

Figure 1:
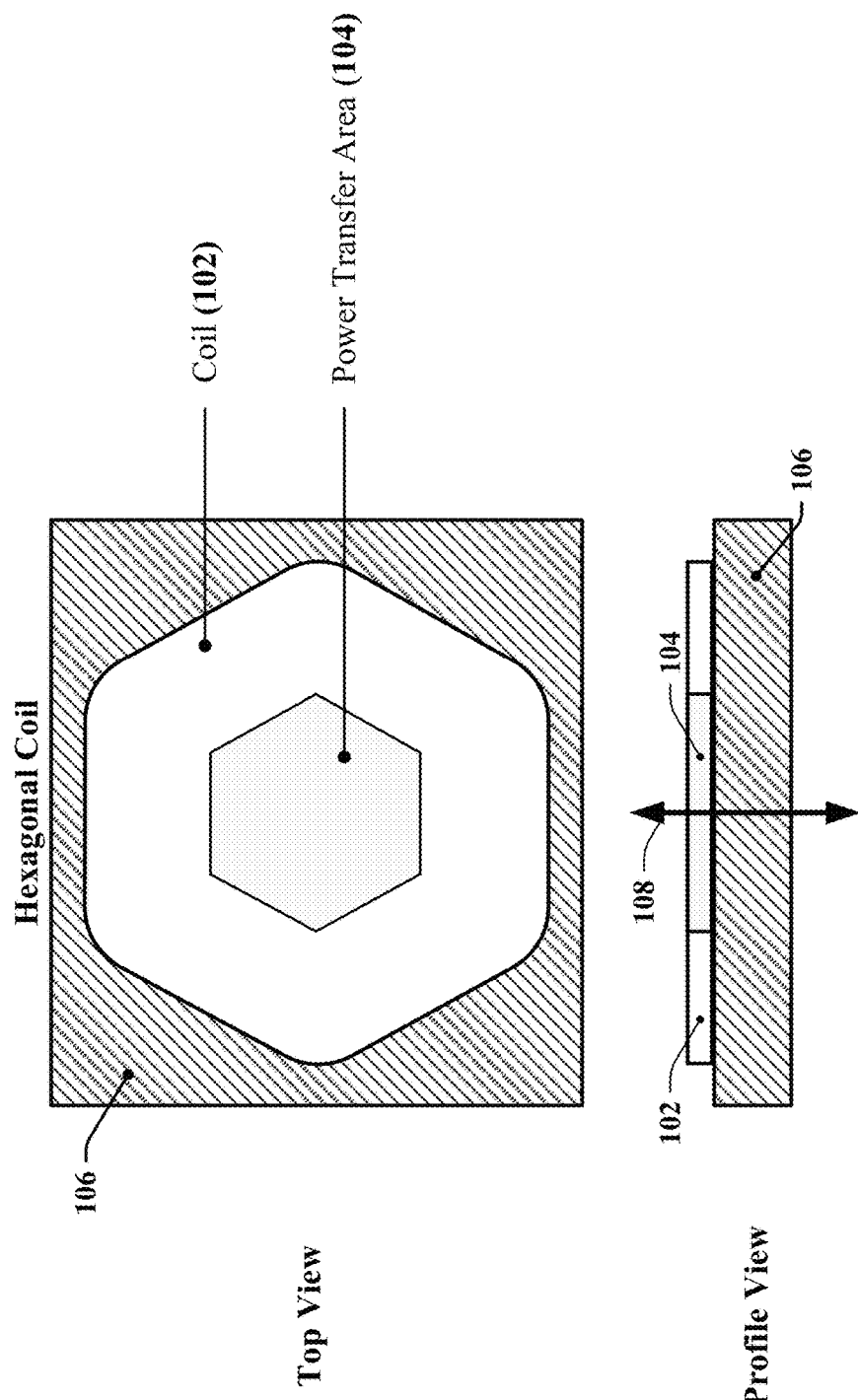
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices that provide a free-positioning charging surface that has multiple transmitting coils or that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

Certain aspects disclosed herein relate to improved wireless charging techniques. Systems, apparatus and methods are disclosed that accommodate free placement of chargeable devices on a surface of a multi-coil wireless charging device. Certain aspects can improve the efficiency and capacity of wireless power transmission to a receiving device. In one example, a wireless charging apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to a charging surface without overlap of power transfer areas of the charging cells in the plurality of charging cells.

In one aspect of the disclosure, an apparatus has a battery-charging power source and a plurality of charging cells, where a controller can select and couple each charging cell to the power source as needed or desired. Each charging cell in the plurality of charging cells may include one or more coils surrounding a power transfer area. The plurality of charging cells may be arranged adjacent to a charging surface without overlap of power transfer areas of the charging cells.

Certain aspects of the present disclosure relate to systems, apparatus and methods for wireless charging using stacked coils that can charge targeted devices presented to a charging device without a requirement to match a particular geometry or location within a charging surface of the charging device. Each coil may have a shape that is substantially polygonal. In one example, each coil may have a hexagonal shape. Each coil may be implemented using wires, printed circuit board traces and/or other connectors that are provided in a spiral. Each coil may span two or more layers separated by an insulator or substrate such that coils in different layers are centered around a common axis.

According to certain aspects disclosed herein, power can be wirelessly transferred to a receiving device located anywhere on a charging surface that can have an arbitrarily defined size or shape without regard to any discrete placement locations enabled for charging. Multiple devices can be simultaneously charged on a single charging surface. The charging surface may be manufactured using printed circuit board technology, at low cost and/or with a compact design.

Charging Cells

Certain aspects of the present disclosure relate to systems, apparatus and methods applicable to wireless charging devices that provide a free-positioning charging surface that has multiple transmitting coils or that can concurrently charge multiple receiving devices. In one aspect, a processing circuit coupled to the free-positioning charging surface can be configured to locate a device to be charged and can select and configure one or more transmitting coils that are optimally positioned to deliver power to the receiving device. Charging cells may be configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

According to certain aspects disclosed herein, a charging surface may be provided using charging cells that are deployed adjacent to the charging surface. In one example the charging cells are deployed in accordance with a honeycomb packaging configuration. A charging cell may be implemented using one or more coils that can each induce a magnetic field along an axis that is substantially orthogonal to the charging surface adjacent to the coil. In this disclosure, a charging cell may refer to an element having one or more coils where each coil is configured to produce an electromagnetic field that is additive with respect to the fields produced by other coils in the charging cell and directed along or proximate to a common axis. In this description, a coil in a charging cell may be referred to as a charging coil or a transmitting coil.

In some implementations, a charging cell includes coils that are stacked along a common axis. One or more coils may overlap such that they contribute to an induced magnetic field substantially orthogonal to the charging surface. In some examples, a charging cell includes coils that are arranged within a defined portion of the charging surface and that contribute to an induced magnetic field within the defined portion of the charging surface, the magnetic field contributing to a magnetic flux flowing substantially orthogonal to the charging surface. In some implementations, charging cells may be configurable by providing an activating current to coils that are included in a dynamicallydefined charging cell. For example, a wireless charging device may include multiple stacks of coils deployed across a charging surface, and the wireless charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils.

FIG. 1 illustrates an example of a charging cell 100 that may be deployed or configured to provide a charging surface in a wireless charging device. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may include or use coils 102 that have other shapes. The shape of the coils 102 may be determined at least in part by the capabilities or limitations of fabrication technology, or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
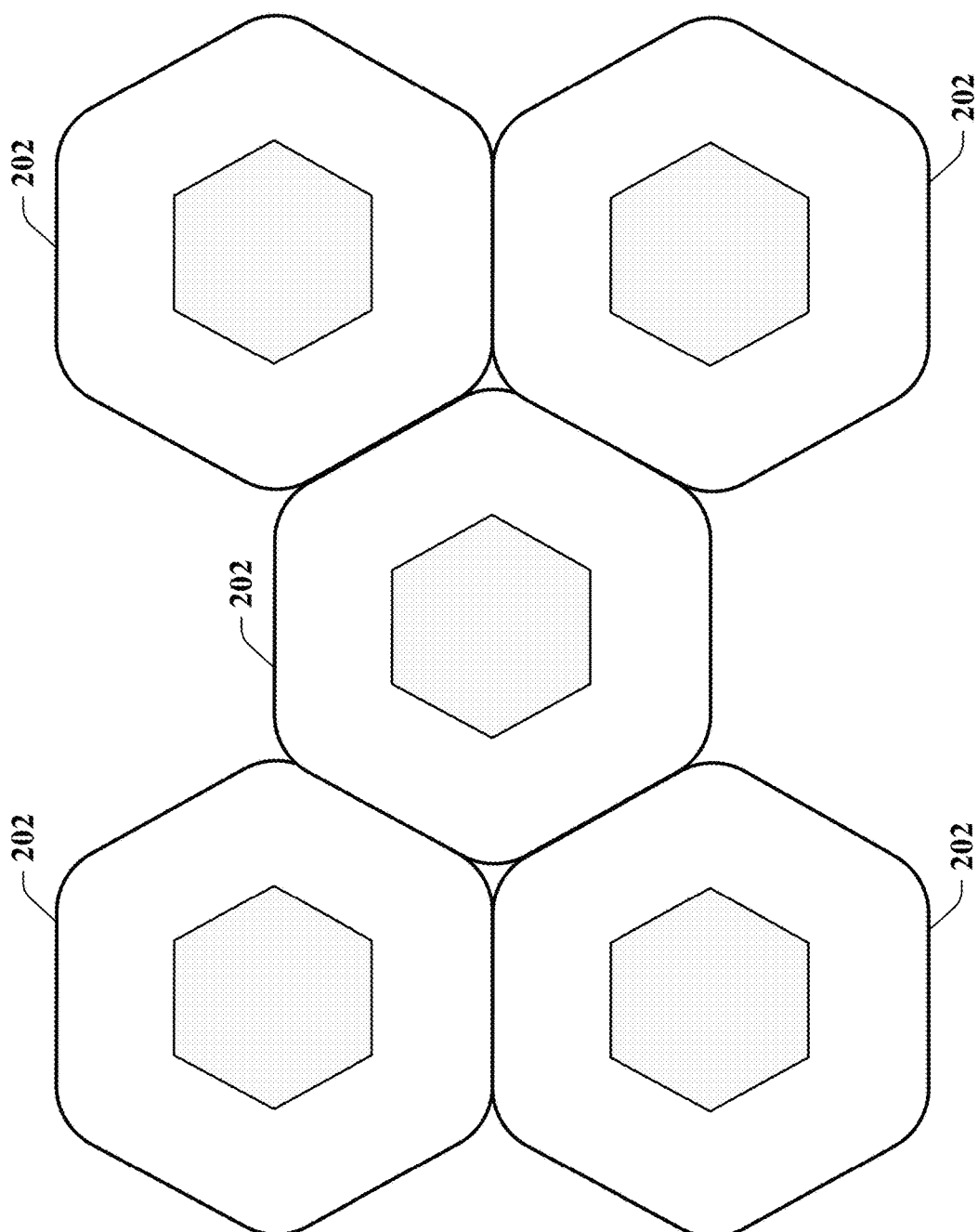
FIG. 2 illustrates an example of an arrangement of charging cells provided on a single layer of a segment of a charging surface that may be adapted in accordance with certain aspects disclosed herein.

FIG. 2 illustrates an example of an arrangement 200 of charging cells 202 provided on a single layer of a segment or portion of a charging surface that may be adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved to some extent.

Figure 3:
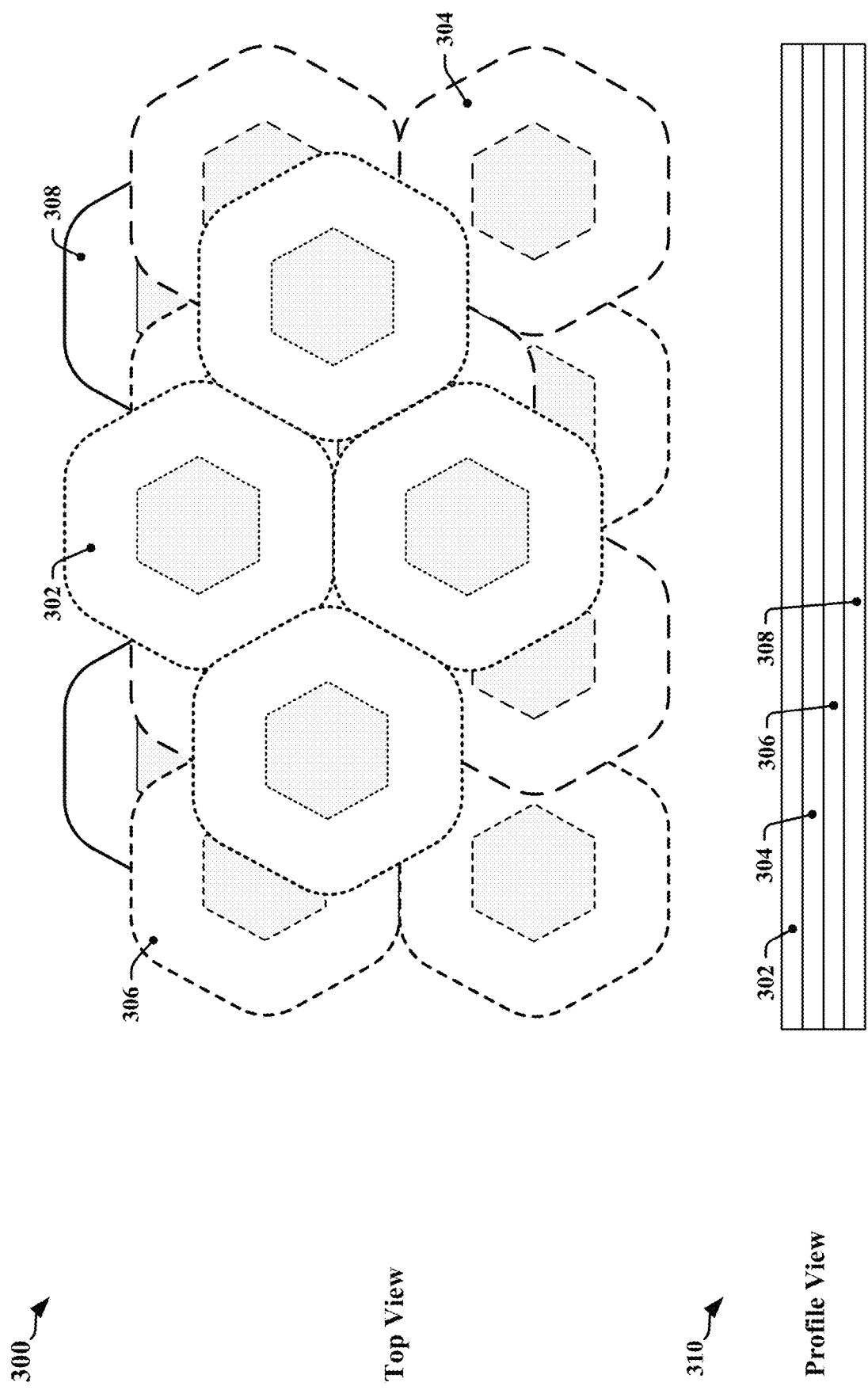
FIG. 3 illustrates an example of an arrangement of charging cells when multiple layers are overlaid within a segment of a charging surface that may be adapted in accordance with certain aspects disclosed herein.

FIG. 3 illustrates an example of an arrangement of charging cells from two perspectives 300, 310 when multiple layers are overlaid within a segment or portion of a charging surface that may be adapted in accordance with certain aspects disclosed herein. Layers of charging cells 302, 304, 306, 308 are provided within the charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment.

Figure 4:
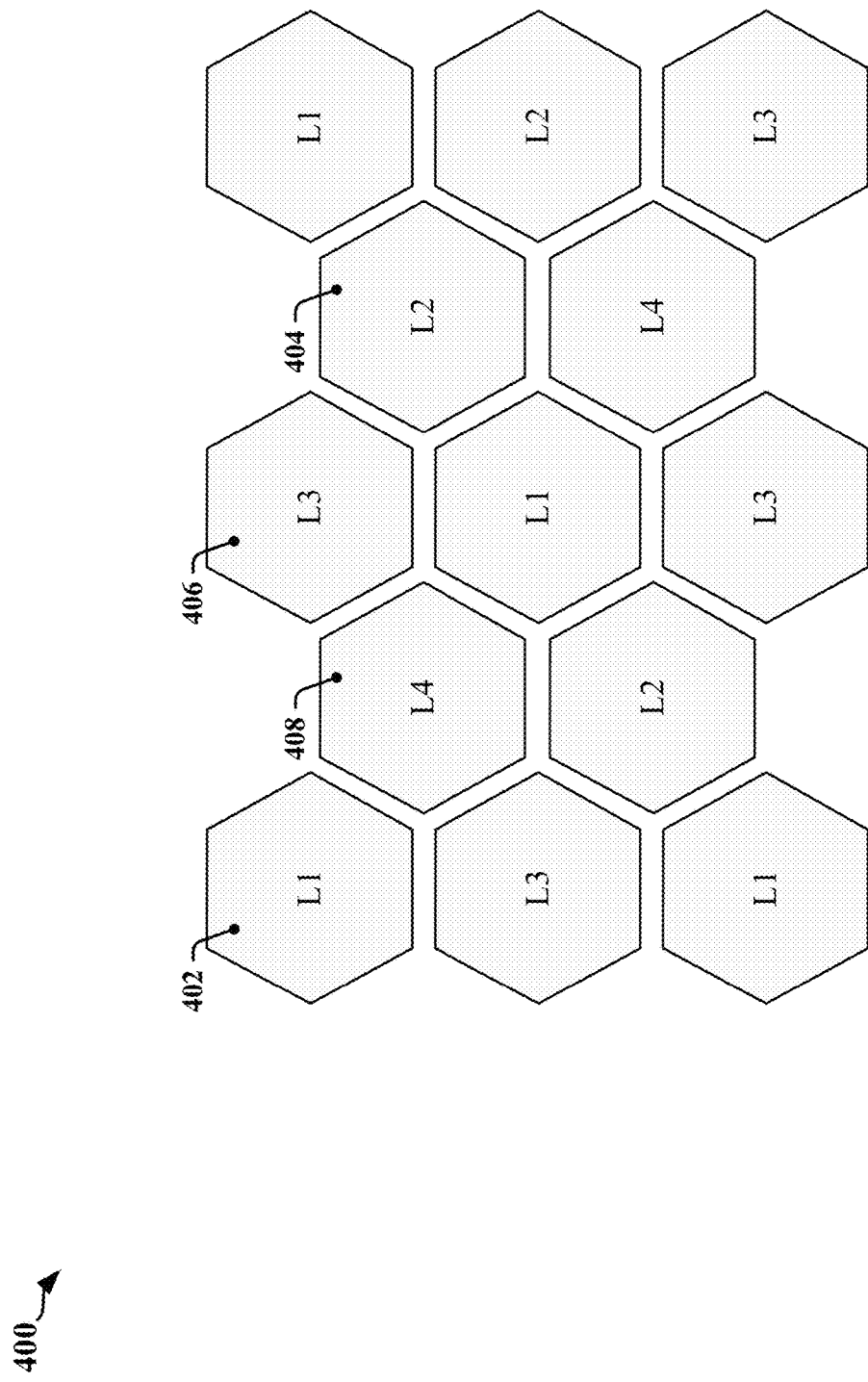
FIG. 4 illustrates the arrangement of power transfer areas provided by a charging surface that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
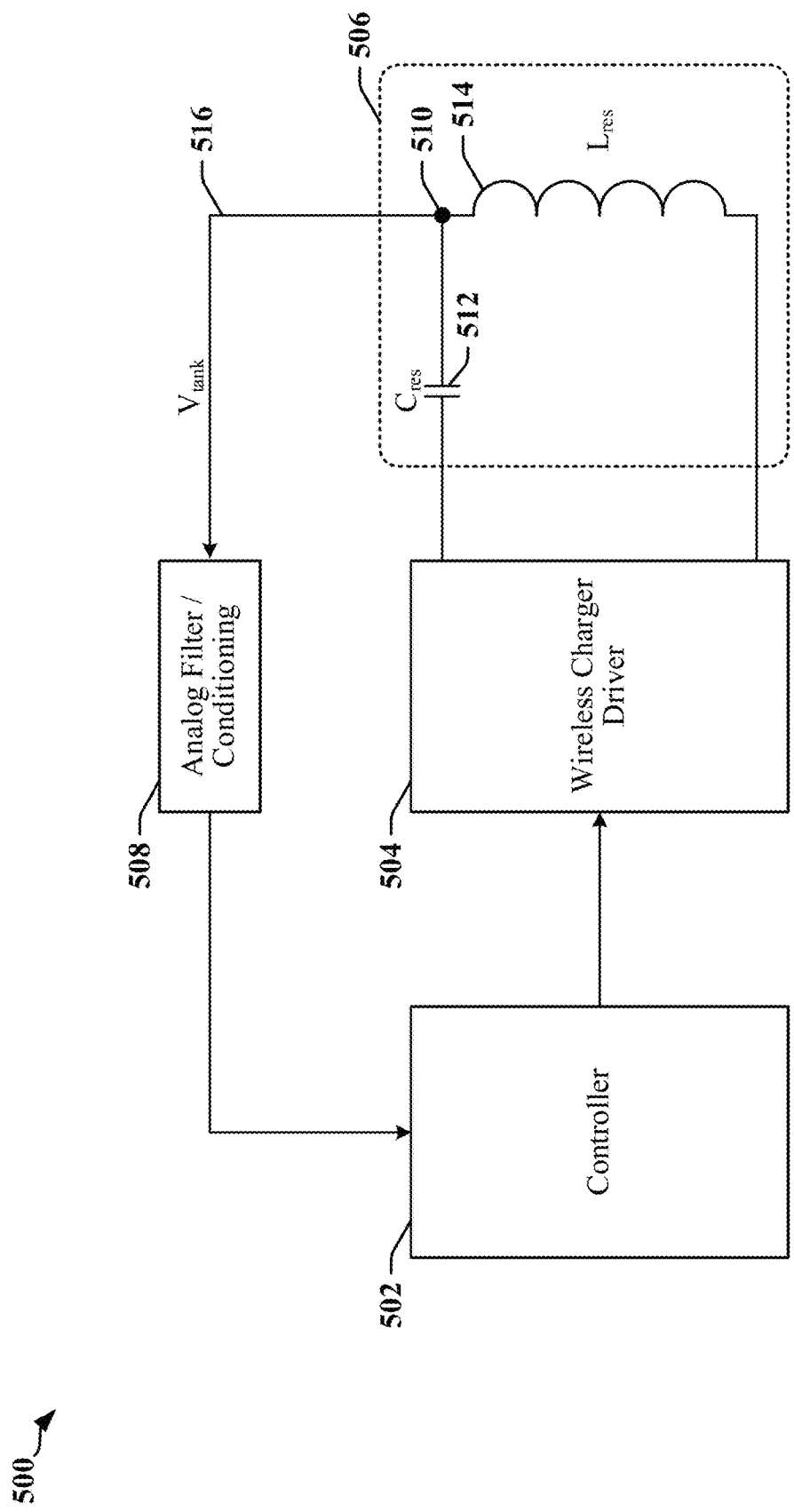
FIG. 5 illustrates a wireless transmitter that may be provided in a charger base station in accordance with certain aspects disclosed herein.

FIG. 5 illustrates an example of a wireless transmitter 500 that can be provided in a base station of a wireless charging device. A base station in a wireless charging device may include one or more processing circuits used to control operations of the wireless charging device. A controller 502 may receive a feedback signal filtered or otherwise processed by a filter circuit 508. The controller may control the operation of a driver circuit 504 that provides an alternating current to a resonant circuit 506. In some examples, the controller 502 may generate a digital frequency reference signal used to control the frequency of the alternating current output by the driver circuit 504. In some instances, the digital frequency reference signal may be generated using a programmable counter or the like. In some examples, the driver circuit 504 includes a power inverter circuit and one or more power amplifiers that cooperate to generate the alternating current from a direct current source or input. In some examples, the digital frequency reference signal may be generated by the driver circuit 504 or by another circuit. The resonant circuit 506 includes a capacitor 512 and inductor 514. The inductor 514 may represent or include one or more transmitting coils in a charging cell that produced a magnetic flux responsive to the alternating current. The resonant circuit 506 may also be referred to herein as a tank circuit, LC tank circuit, or LC tank, and the voltage 516 measured at an LC node 510 of the resonant circuit 506 may be referred to as the tank voltage.

Passive ping techniques may use the voltage and/or current measured or observed at the LC node 510 to identify the presence of a receiving coil in proximity to the charging pad of a device adapted in accordance with certain aspects disclosed herein. Some conventional wireless charging devices include circuits that measure voltage at the LC node 510 of the resonant circuit 506 or the current in the resonant circuit 506. These voltages and currents may be monitored for power regulation purposes and/or to support communication between devices. According to certain aspects of this disclosure, voltage at the LC node 510 in the wireless transmitter 500 illustrated in FIG. 5 may be monitored to support passive ping techniques that can detect presence of a chargeable device or other object based on response of the resonant circuit 506 to a short burst of energy (the ping) transmitted through the resonant circuit 506.

A passive ping discovery technique may be used to provide fast, low-power discovery. A passive ping may be produced by driving a network that includes the resonant circuit 506 with a fast pulse that includes a small amount of energy. The fast pulse excites the resonant circuit 506 and causes the network to oscillate at its natural resonant frequency until the injected energy decays and is dissipated. The response of a resonant circuit 506 to a fast pulse may be determined in part by the resonant frequency of the resonant LC circuit. A response of the resonant circuit 506 to a passive ping that has initial voltage=$V_0$ may be represented by the voltage $V_{LC}$ observed at the LC node 510, such that:

$$V_{LC} = V_0 e^{-\left(\frac{\omega}{2Q}\right)t} \quad \text{(Eq. 1)}$$

The resonant circuit 506 may be monitored when the controller 502 or another processor is using digital pings to detect presence of objects. A digital ping is produced by driving the resonant circuit 506 for a period of time. The resonant circuit 506 is a tuned network that includes a transmitting coil of the wireless charging device. A receiving device may modulate the voltage or current observed in the resonant circuit 506 by modifying the impedance presented by its power receiving circuit in accordance with signaling state of a modulating signal. The controller 502 or other processor then waits for a data modulated response that indicates that a receiving device is nearby.

Selectively Activating Coils

According to certain aspects disclosed herein, coils in one or more charging cells may be selectively activated to provide an optimal electromagnetic field for charging a compatible device. In some instances, coils may be assigned to charging cells, and some charging cells may overlap other charging cells. The optimal charging configuration may be selected at the charging cell level. In some examples, a charging configuration may include charging cells in a charging surface that are determined to be aligned with or located close to the device to be charged. A controller may activate a single coil or a combination of coils based on the charging configuration which in turn is based on detection of location of the device to be charged. In some implementations, a wireless charging device may have a driver circuit that can selectively activate one or more transmitting coils or one or more predefined charging cells during a charging event.

Figure 6:
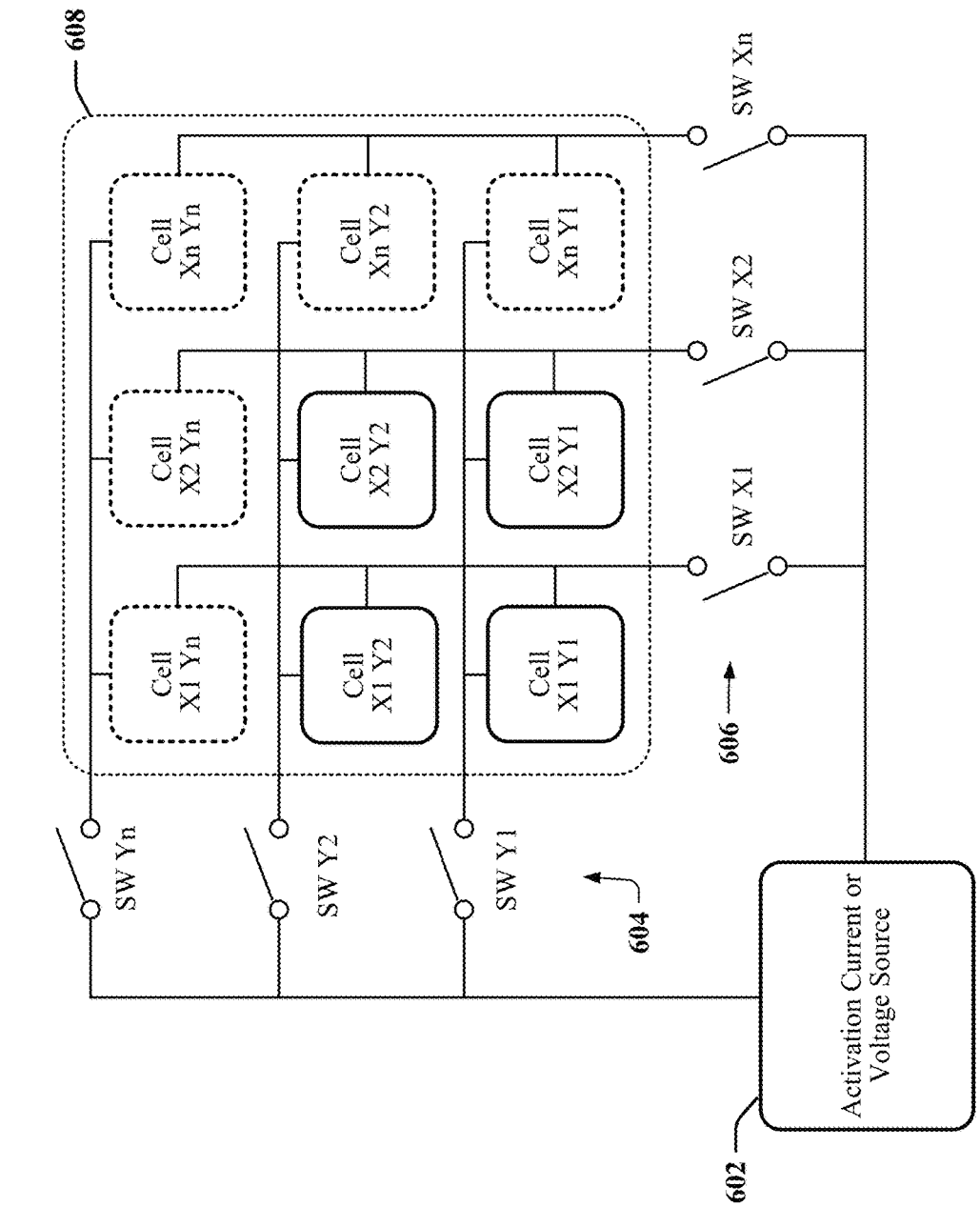
FIG. 6 illustrates a first topology that supports matrix multiplexed switching for use in a wireless charging device adapted in accordance with certain aspects disclosed herein.

FIG. 6 illustrates a first topology 600 that supports matrix multiplexed switching for use in a wireless charging device adapted in accordance with certain aspects disclosed herein. The wireless charging device may select one or more charging cells 100 to charge a receiving device. Charging cells 100 that are not in use can be disconnected from current flow. A relatively large number of charging cells 100 may be used in the honeycomb packaging configuration illustrated in FIGS. 2 and 3, requiring a corresponding number of switches. According to certain aspects disclosed herein, the charging cells 100 may be logically arranged in a matrix 608 having multiple cells connected to two or more switches that enable specific cells to be powered. In the illustrated topology 600, a two-dimensional matrix 608 is provided, where the dimensions may be represented by X and Y coordinates. Each of a first set of switches 606 is configured to selectively couple a first terminal of each cell in a column of cells to a first terminal of a voltage or current source 602 that provides current to activate coils in one or more charging cells during wireless charging. Each of a second set of switches 604 is configured to selectively couple a second terminal of each cell in a row of cells to a second terminal of the voltage or current source 602. A charging cell is active when both terminals of the cell are coupled to the voltage or current source 602.

The use of a matrix 608 can significantly reduce the number of switching components needed to operate a network of tuned LC circuits. For example, N individually connected cells require at least N switches, whereas a two-dimensional matrix 608 having N cells can be operated with √N switches. The use of a matrix 608 can produce significant cost savings and reduce circuit and/or layout complexity. In one example, a 9-cell implementation can be implemented in a 3×3 matrix 608 using 6 switches, saving 3 switches. In another example, a 16-cell implementation can be implemented in a 4×4 matrix 608 using 8 switches, saving 8 switches.

During operation, at least 2 switches are closed to actively couple one coil or charging cell to the voltage or current source 602. Multiple switches can be closed at once in order to facilitate connection of multiple coils or charging cells to the voltage or current source 602. Multiple switches may be closed, for example, to enable modes of operation that drive multiple transmitting coils when transferring power to a receiving device.

Figure 7:
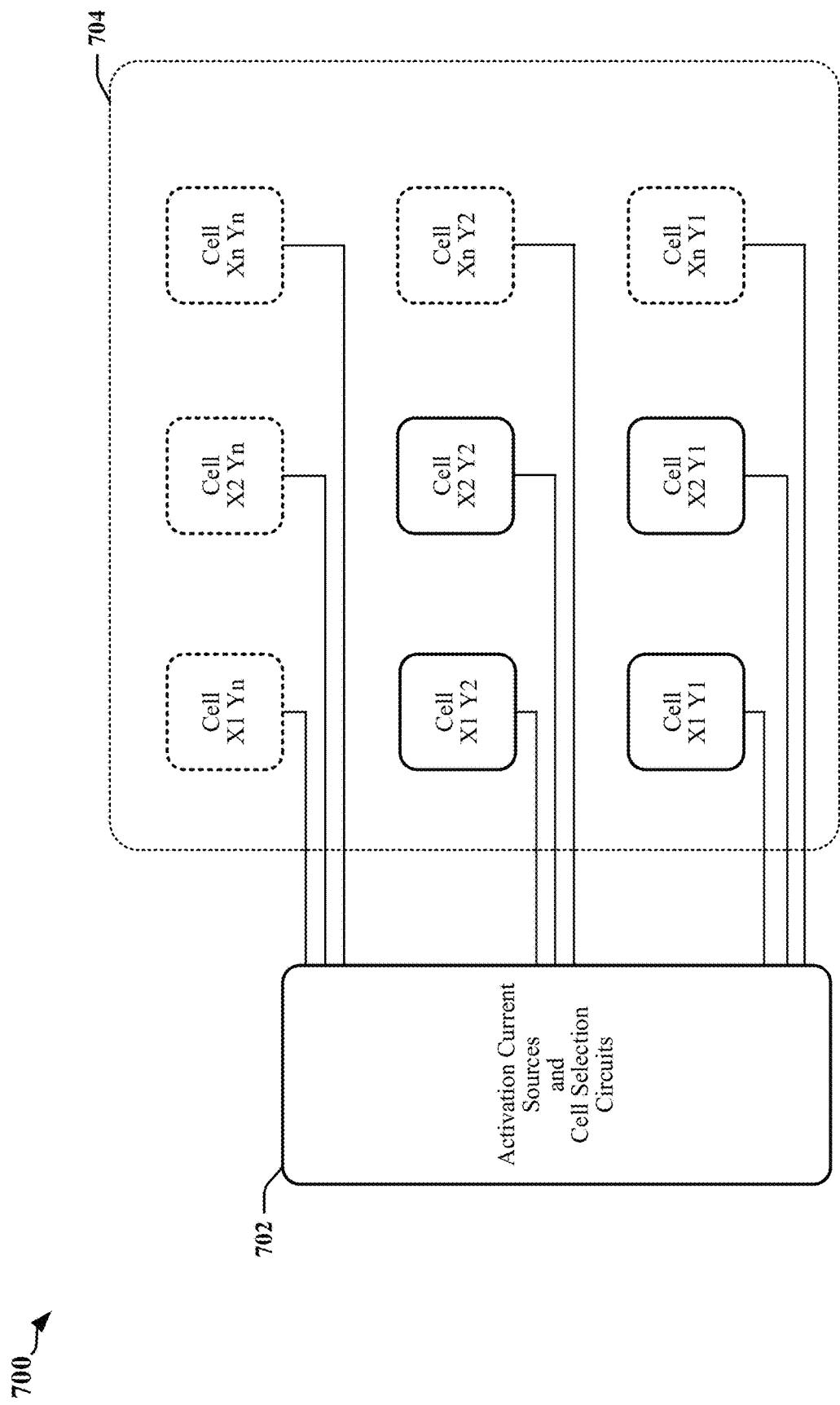
FIG. 7 illustrates a second topology that supports direct current drive in a wireless charging device adapted in accordance with certain aspects disclosed herein.

FIG. 7 illustrates a second topology 700 in which each individual coil or charging cell is directly driven by a driver circuit 702 in accordance with certain aspects disclosed herein. The driver circuit 702 may be configured to select one or more coils or charging cells 100 from a group of coils 704 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix may be used to activate the charging cell and/or group of selected coils.

Dynamic Multi-Coil Tuning

Certain aspects disclosed herein relate to tuned networks that include one or more capacitors and one or more inductors. Tuned networks may be employed in charging systems in which a base station is electromagnetically coupled to a receiving device. Networks may be tuned to optimize power transfer, to enable communication between a base station and a receiving device or to enable the base station to detect presence of a receiving device. Some wireless charging devices and power supplies are designed to maintain a constant setpoint, where the setpoint may define a level of power, current or voltage.

Figure 8:
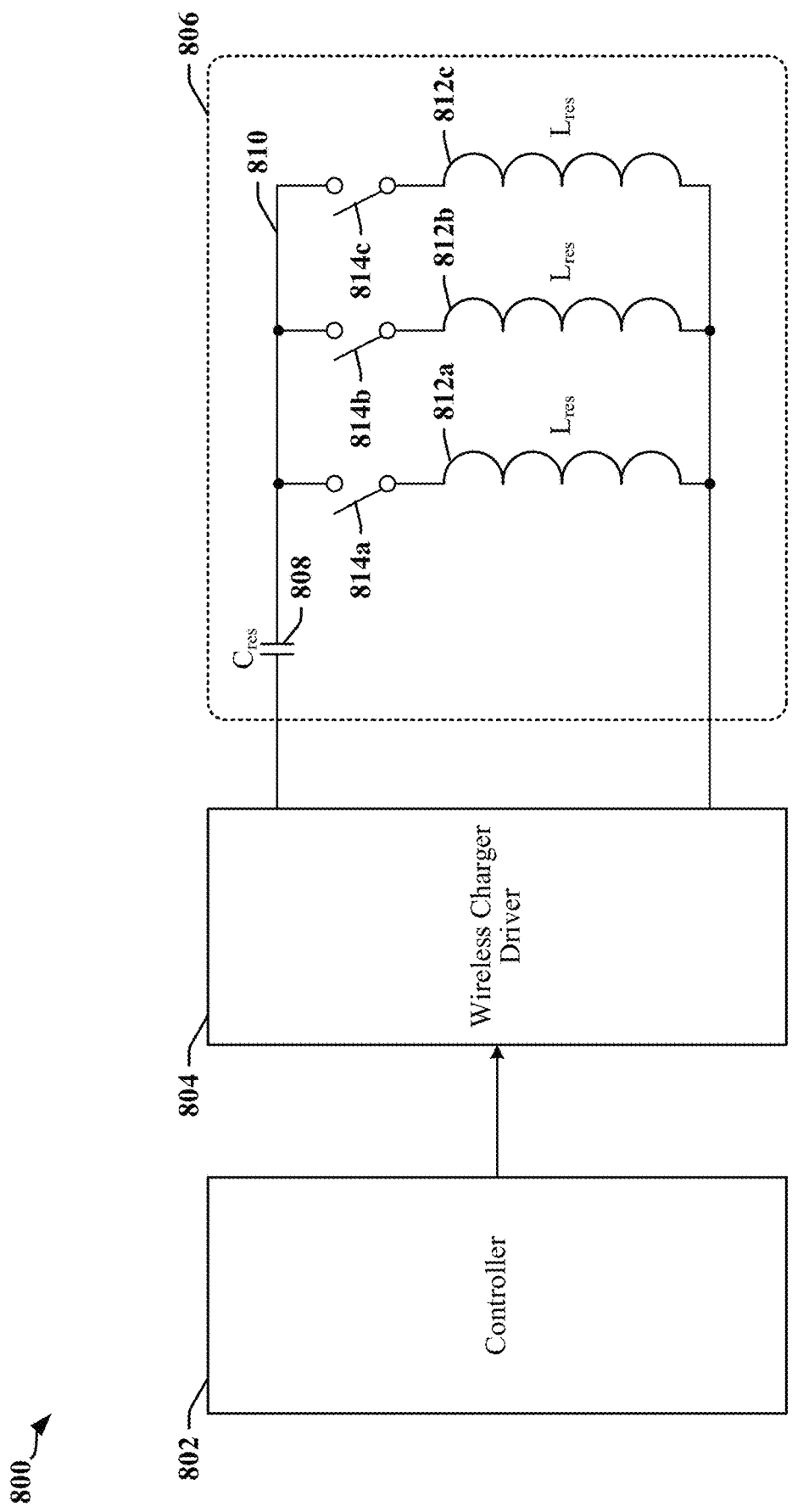
FIG. 8 illustrates a wireless transmitter provided in accordance with certain aspects disclosed herein.

Certain aspects of this disclosure provide techniques usable in a wireless charging device to maintain or sustain performance of circuits that employ tuned circuits. FIG. 8 illustrates a wireless transmitting circuit 800 provided in a base station of a wireless charging device, where the wireless transmitting circuit 800 can couple a driver 804 to one or more coils 812a, 812b, 812c in a resonant circuit 806 during charging and/or detection operations. In one example, each coil 812a, 812b, 812c corresponds to transmitting coil activated by a charging configuration. In another example, each coil 812a, 812b, 812c represents one charging cell selected to transmit power by a charging configuration. The illustrated example shows three coils 812a, 812b, 812c although it will be appreciated that a much larger number of coils may be selected or affected by a charging configuration. The coils 812a, 812b, 812c coupled to the driver 804 may be selected to provide a charging configuration optimized to facilitate delivery of power to the location of a receiving device placed on a charging surface. In the illustrated example, the resonant circuit 806 is configured by a set of switches 814a, 814b, 814c that enables each coil 812a, 812b, 812c to be selectively coupled to a source of charging current 810 provided by the driver 804 through a capacitor 808. The impedance of the resonant circuit 806 is defined by a capacitor 808 that has a nominal capacitance ($C_{res}$), and the combination of coupled coils 812a, 812b, 812c. In the illustrated example, each of the coils 812a, 812b, 812c has a nominal inductance ($L_{res}$). The impedance of the resonant circuit 806 varies with the number of coils 812a, 812b, 812c coupled to the driver 804. Accordingly, a resonant circuit 806 that is tuned when it includes the capacitor 808 and one or more coils 812a, 812b, 812c is detuned when the number of coils 812a, 812b, 812c is changed.

In certain aspects of this disclosure, table-based dynamic tuning can be used when the configuration of the resonant circuit 806 is changed. The resonant frequency of a tuned resonant circuit 806 may change when additional inductors are switched into the resonant circuit 806. Power transmission level or efficiency for the wireless transmitting circuit 800 may be optimized when the frequency of the charging current 810 is tuned to match the resonant frequency of the resonant circuit 806, and optimization may be maintained by retuning the frequency of the charging current 810 after the frequency of the resonant circuit 806 has been changed. A setpoint associated with the wireless transmitting circuit 800 may be maintained by adjusting the frequency of the charging current 810 to obtain a desired or specified level of power, current and/or voltage.

The frequency of the charging current 810 may be referred to herein as an operating point. The operating point may be selected through a lookup table that relates frequency to the number, type and/or identity of coils included in the resonant circuit 806. In one example, the lookup table may relate frequency to known values of inductance associated with the individual coils included in the resonant circuit 806. The use of a lookup table may maintain near-constant output from the supply from the wireless transmitting circuit 800. For example, the lookup table may provide information that permits the controller 802 or another processor to change the frequency of the charging current 810 provided by the driver 804 concurrently with changes in coil configuration.

Figure 9:
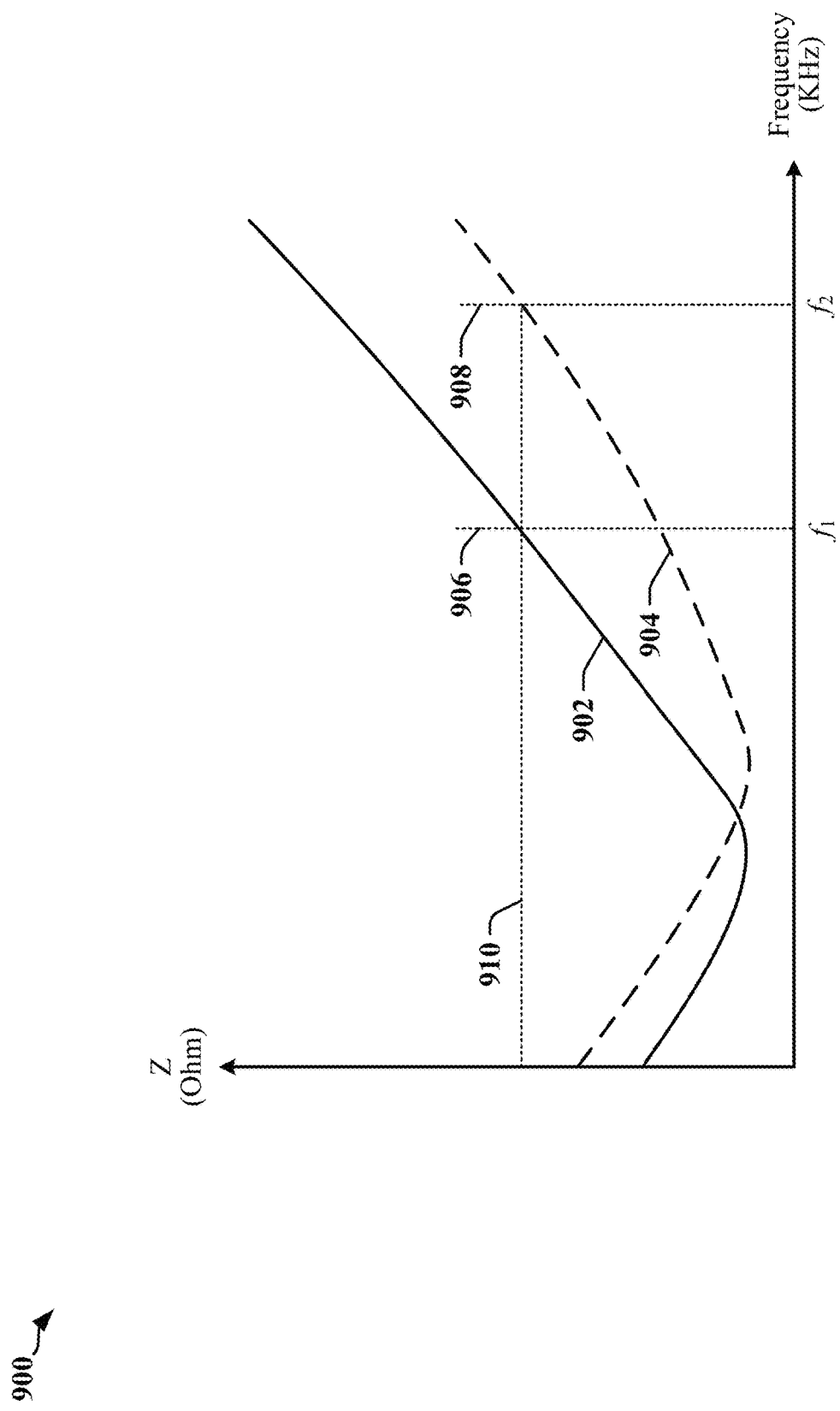
FIG. 9 illustrates first examples of impedance characteristics for a resonant circuit that may be adapted in accordance with certain aspects disclosed herein.

The diagram 900 in FIG. 9 illustrates impedance characteristics 902, 904 for two configurations of the resonant circuit 806, where the configurations include different numbers of coils 812a, 812b, 812c. The resonant circuit 806 may be designed with a setpoint that is obtained when the resonant circuit 806 has a nominal or optimal impedance 910. The impedance characteristics 902, 904 illustrate that impedance is a function of frequency of the charging current 810 and also varies with resonant frequency. When the configuration of the resonant circuit 806 changes, the controller 802 may change the frequency of the charging current 810 to obtain the nominal or optimal impedance 910. In implementations where a finite or limited number of configurations of the resonant circuit 806 are available, a look-up table can be used to define a frequency of the charging current 810 for each configuration of the resonant circuit 806. The frequencies recorded in the table may be obtained during initial configuration at the time of device assembly or manufacture, and/or can be updated or calibrated during operation of the wireless transmitting circuit 800. The lookup table based approach can be used to enable fast and low-overhead tuning between operating points 906, 908.

Figure 10:
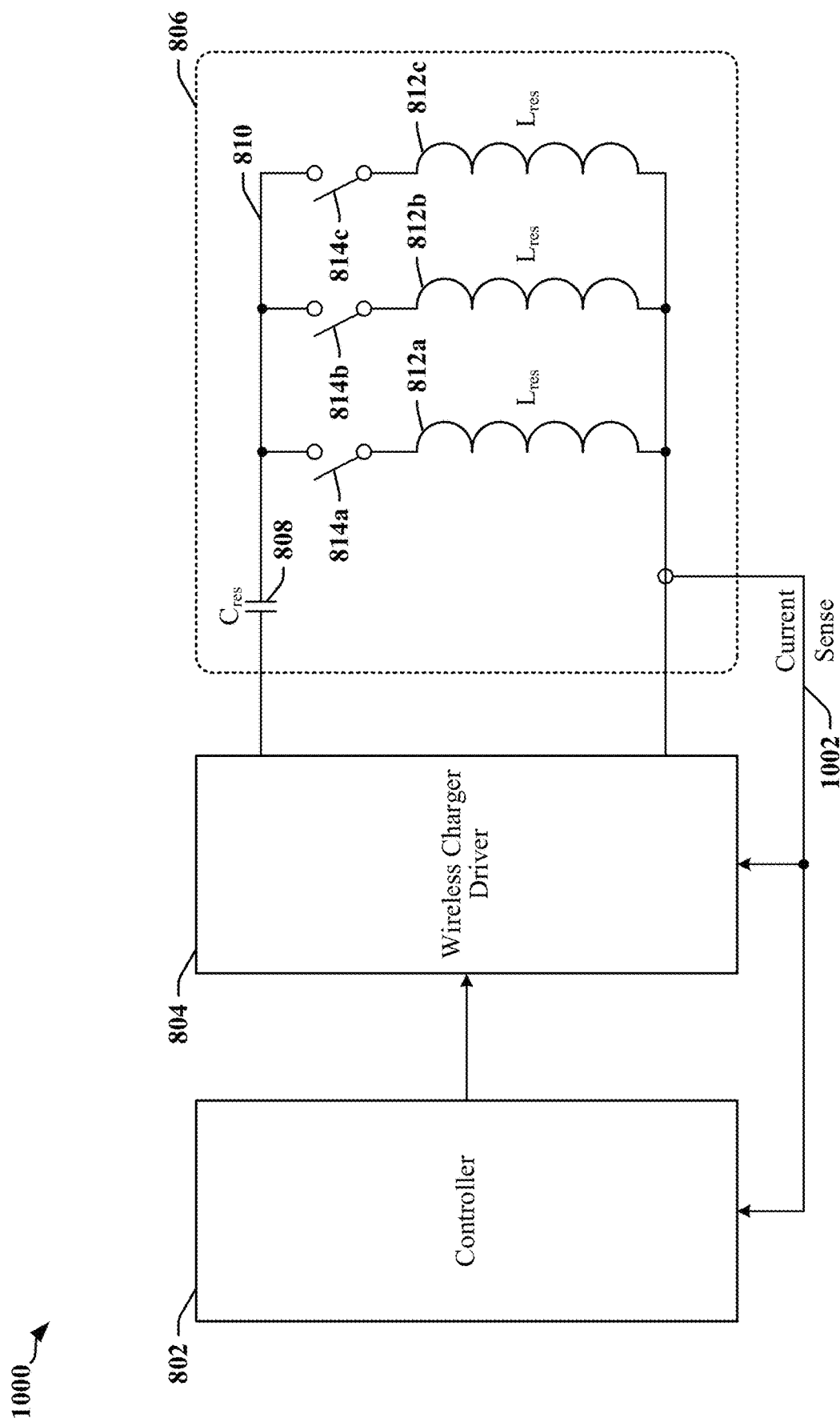
FIG. 10 illustrates a continuously-tunable wireless transmitter provided in accordance with certain aspects disclosed herein.
Figure 11:
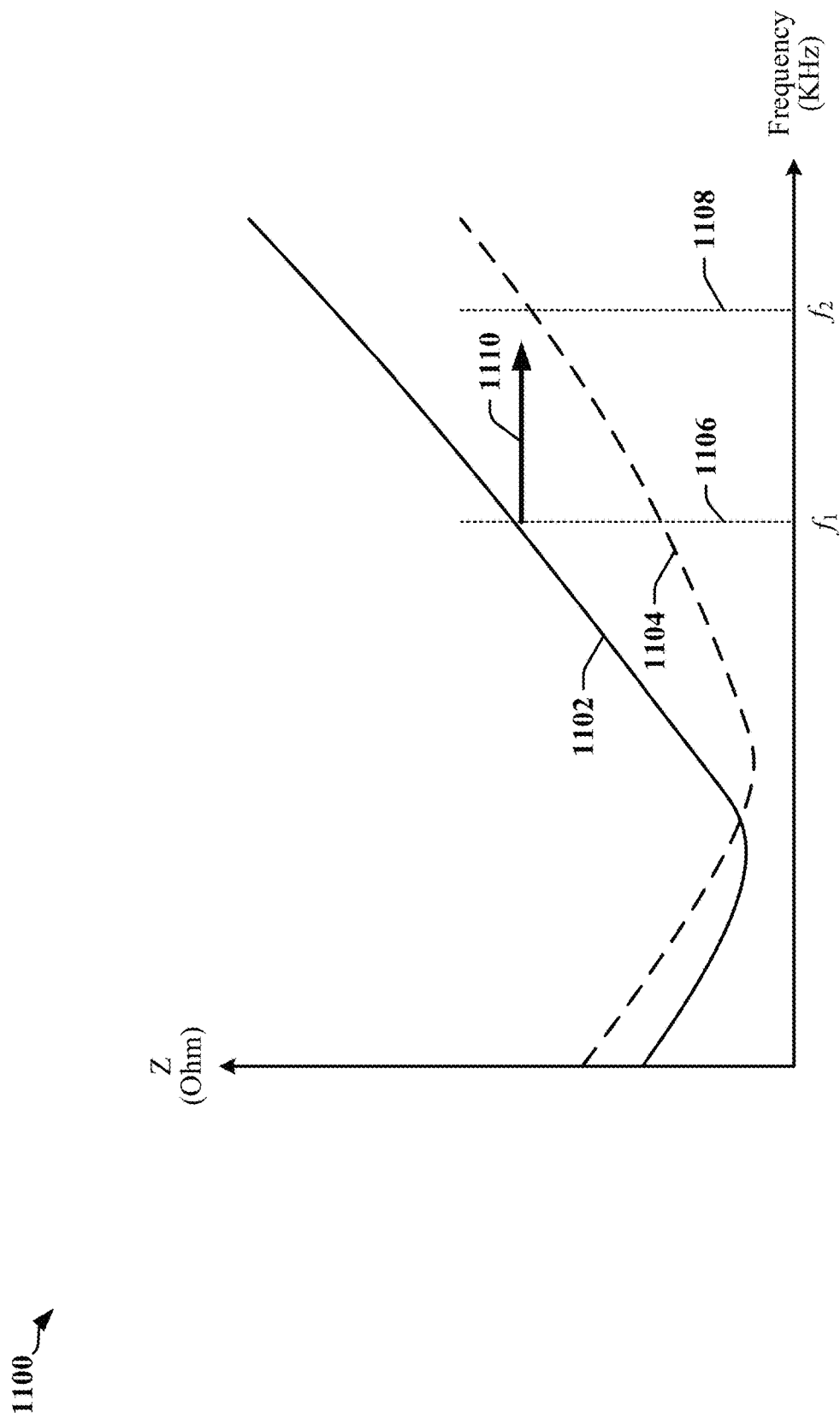
FIG. 11 illustrates second examples of impedance characteristics for a resonant circuit that may be adapted in accordance with certain aspects disclosed herein.

According to certain aspects of the disclosure, the resonant circuit 806 may be continuously tuned in some implementations. FIG. 10 illustrates a continuously-tunable wireless transmitter 1000 provided in a base station of the wireless charging device, and the diagram 1100 in FIG. 11 illustrates impedance characteristics 1102, 1104 corresponding to two different configurations of the resonant circuit 806 and/or for a configuration of the resonant circuit 806 affected by differences in location of a power receiving device coupled to the resonant circuit 806. In FIG. 11, the resonant circuit 806 is transitioning 1110 from a first operating point 1106 to a second operating point 1108. The transition between operating points 1106, 1108 may be caused by a change in the number of coils 812a, 812b, 812c activated in the resonant circuit 806 and/or by a repositioning of the receiving device that affects the electromagnetic coupling between the resonant circuit 806 and the receiving device.

The continuously-tunable wireless transmitter 1000 includes the elements of the wireless transmitting circuit 800 in FIG. 8 with an additional feedback loop 1002. In one example, the feedback loop 1002 operates as a current sense feedback loop that enables the driver 804 or controller 802 to monitor power transfers as indicated by the current flow through the resonant circuit 806. The driver 804 or controller 802 may adjust the operating point 1106, 1108 to track changes in impedance of the resonant circuit 806. In one example, changes in the impedance of the resonant circuit 806 are tracked by incrementally adjusting the frequency of the charging current 810.

The driver 804 or controller 802 may include or implement a proportional-integral-derivative (PID) tuning. PID tuning can be implemented using a control loop that includes the current sense feedback 1002. The driver 804 or controller 802 may continuously calculate an error value as the difference between a desired setpoint for the current flow in the resonant circuit 806 and the measured current flow in the resonant circuit 806, as indicated by the current sense feedback 1002. The driver 804 or controller 802 may apply a correction calculated as some combination of proportional, integral, and derivative values (referred to as P, I, and D values respectively).

PID-based dynamic tuning can be implemented as a PID loop enabled after and/or during a change in configuration of the resonant circuit 806. A sufficiently fast PID loop can be free-running and changes can be applied without added delay. In some instances, the PID loop implemented by the driver 804 or controller 802 may not be able to respond with sufficient speed to changes in configuration of the resonant circuit 806, and a transitional period may be added to gradually change the configuration from one operating point to another. In one example, a delay may be introduced using pulse-width modulation applied to switches 814a, 814b, 814c or through a switch 814a, 814b, 814c that transitions though a linear mode of operation.

Figure 12:
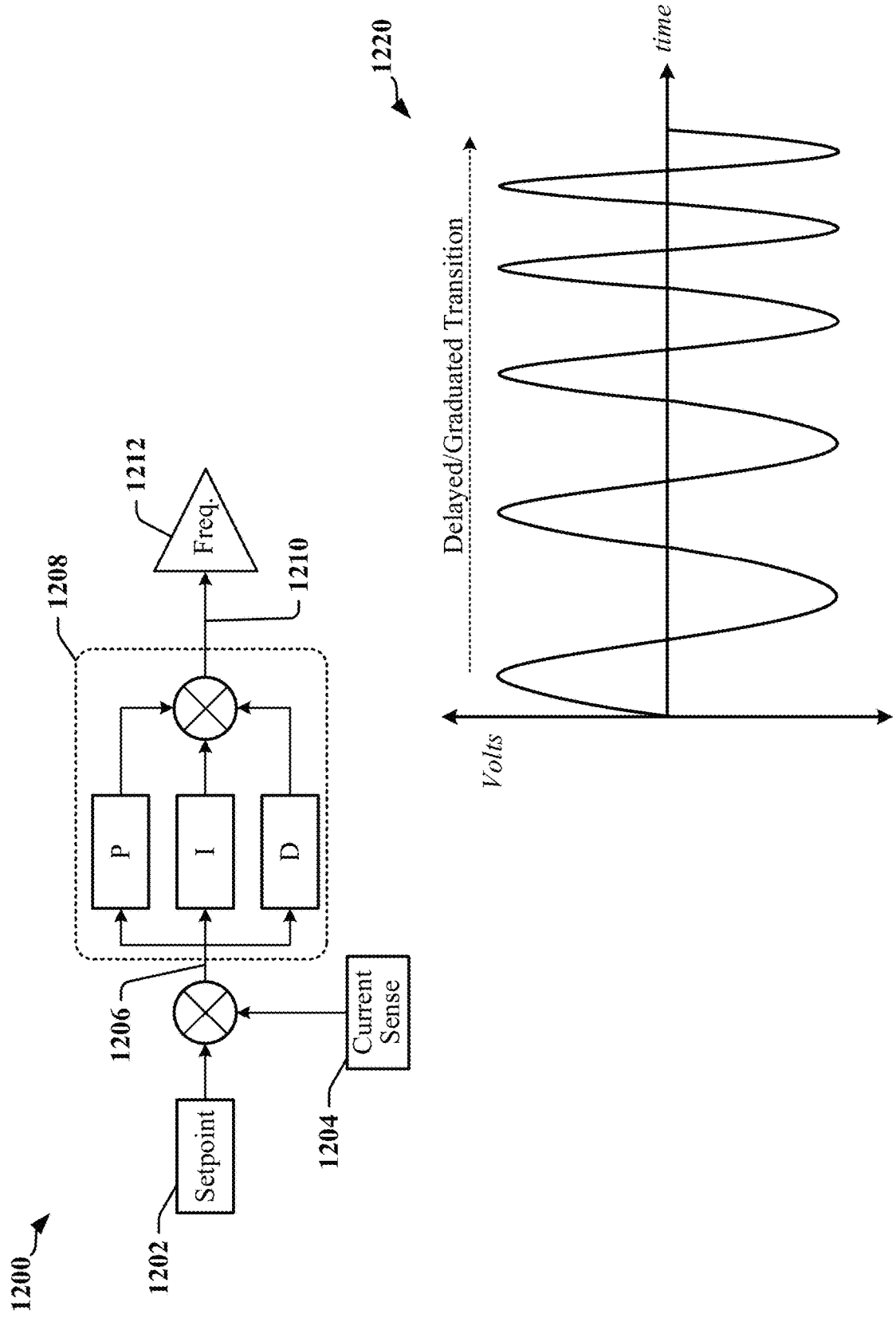
FIG. 12 illustrates an example of a control circuit that may be adapted in accordance with certain aspects disclosed herein.

FIG. 12 illustrates an example of a PID control circuit 1200. A defined setpoint 1202 and the current sense feedback 1204 are received and combined to obtain an error value 1206 that is provided to the PID processor 1208. The PID processor 1208 generates a control signal 1210 that controls a frequency generator 1212 used to provide the charging current 810. The timing diagram 1220 illustrates a graduated transition in frequency of the charging current 810 when the driver 804 or controller 802 is unable to respond with sufficient speed to changes in configuration of the resonant circuit 806. It will be appreciated that other control circuits and/or algorithms may be used including, for example, systems that employ controllers based on Prandtl-Ishlinskii (PI) hysteresis, etc. The type of control loop used is selected based on system requirements or specifications.

Figure 13:
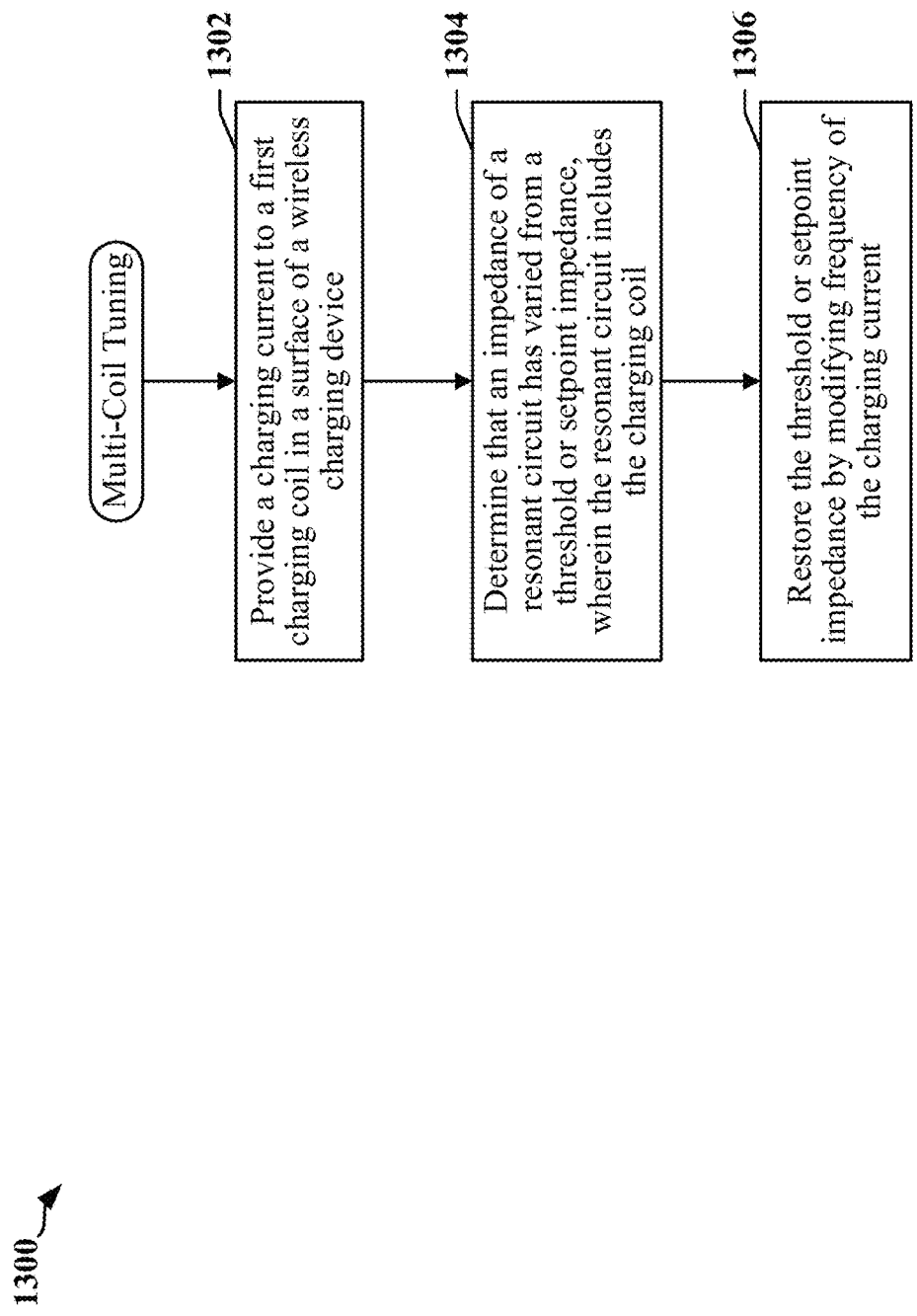
FIG. 13 is flowchart illustrating an example of a method for detecting an object performed by a controller provided in a wireless charging apparatus adapted in accordance with certain aspects disclosed herein.

FIG. 13 is a flowchart 1300 illustrating one example of a method for operating a wireless charging device. The method may be performed by a controller provided in a wireless charging apparatus. At block 1302, the controller may provide a charging current to a first charging coil in a surface of the wireless charging device. At block 1304, the controller may determine that an impedance of a resonant circuit has varied from a threshold or setpoint impedance. The resonant circuit may include the first charging coil. At block 1306, the controller may restore the threshold or setpoint impedance by modifying the frequency of the charging current.

In certain implementations, the controller may couple a second charging coil to the resonant circuit. The controller may provide the charging current to the second charging coil. The coupling of the second charging coil may modify the impedance of the resonant circuit. The controller may use a lookup table to determine the frequency of the charging current to be used after the second charging coil is coupled to the resonant circuit.

In certain implementations, the controller may decouple a second charging coil from the resonant circuit. Decoupling the second charging coil may modify the impedance of the resonant circuit. The controller may use a lookup table to determine the frequency of the charging current to be used after the second charging coil is decoupled from the resonant circuit.

In one example, the impedance of the resonant circuit is modified by a change in location of a receiving device on the surface of the wireless charging device.

In certain implementations, the controller may detect a change in a monitored current that flows in the resonant circuit, and may determine that the impedance of the resonant circuit has varied based on the change in the monitored current. The controller may receive a feedback signal representative of the change in the monitored current, and may control the frequency of the charging current using the feedback signal. Controlling the frequency of the charging current may include incrementally adjusting the frequency of the charging current until the impedance of the resonant circuit matches the threshold or setpoint impedance. Controlling the frequency of the charging current may include delaying modification of the frequency of the charging current.

Example of a Processing Circuit

Figure 14:
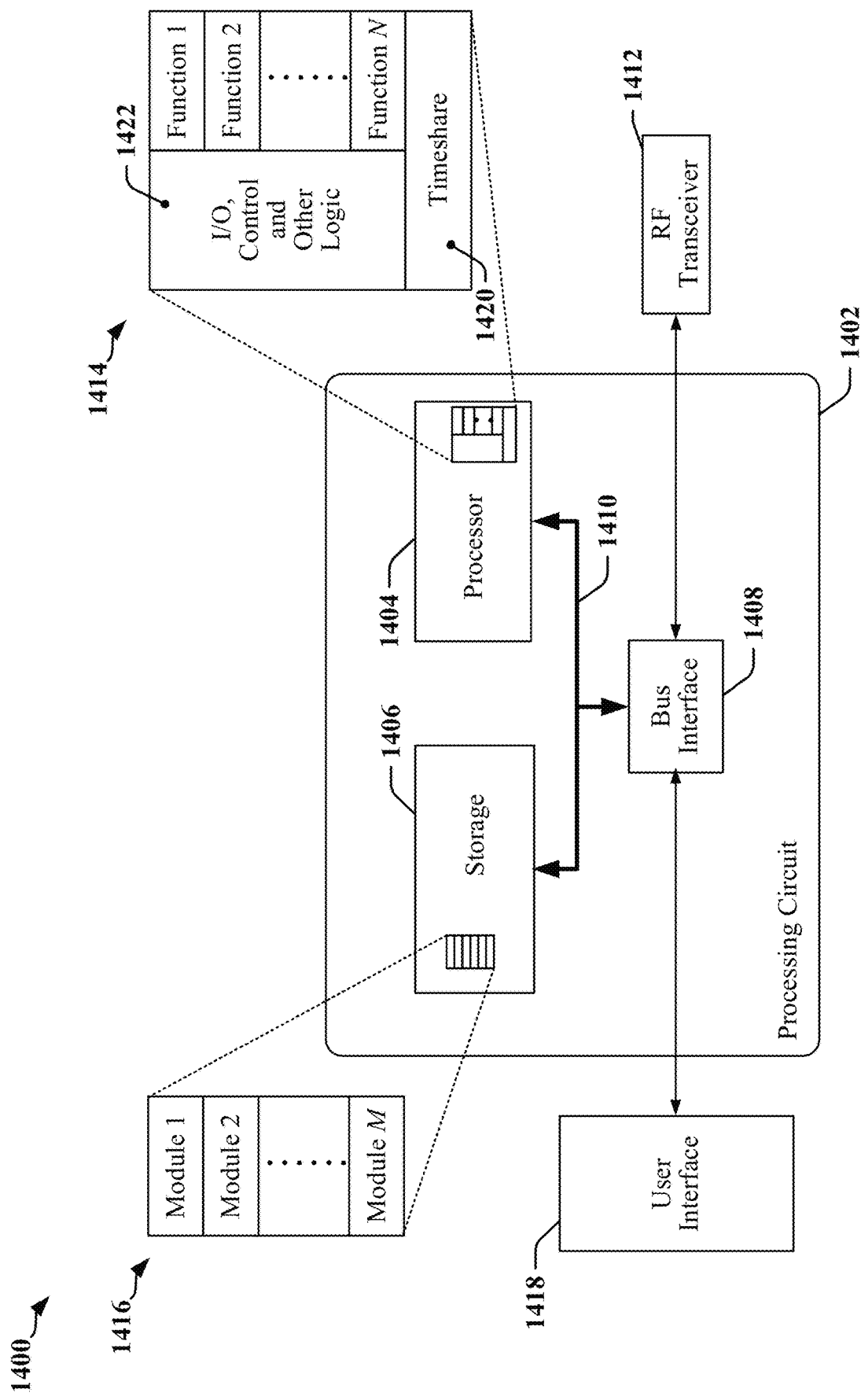
FIG. 14 illustrates one example of an apparatus employing a processing circuit that may be adapted according to certain aspects disclosed herein.

FIG. 14 illustrates an example of a hardware implementation for an apparatus 1400 that may be incorporated in a wireless charging device or in a receiving device that enables a battery to be wirelessly charged. In some examples, the apparatus 1400 may perform one or more functions disclosed herein. In accordance with various aspects of the disclosure, an element, or any portion of an element, or any combination of elements as disclosed herein may be implemented using a processing circuit 1402. The processing circuit 1402 may include one or more processors 1404 that are controlled by some combination of hardware and software modules. Examples of processors 1404 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media and/or processor-readable media. The storage 1406 may include transitory storage media and/or non-transitory storage media.

The bus 1410 may also link various other circuits such as timing sources, timers, peripherals, voltage regulators, and power management circuits. A bus interface 1408 may provide an interface between the bus 1410 and one or more transceivers 1412. In one example, a transceiver 1412 may be provided to enable the apparatus 1400 to communicate with a charging or receiving device in accordance with a standards-defined protocol. Depending upon the nature of the apparatus 1400, a user interface 1418 (e.g., keypad, display, speaker, microphone, joystick) may also be provided, and may be communicatively coupled to the bus 1410 directly or through the bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer-readable medium. The external computer-readable medium and/or storage 1406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain and/or organize software in loadable code segments, modules, applications, programs, etc., some or all of which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as a transceiver 1412, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to a transceiver 1412, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

In one example, the apparatus 1400 includes or operates as a wireless charging apparatus that has a battery charging power source coupled to a charging circuit, a plurality of charging cells and a controller, which may be included in one or more processors 1404. The plurality of charging cells may be configured to provide a charging surface. At least one coil may be configured to direct an electromagnetic field through a charge transfer area of each charging cell.

The controller may be configured to provide a charging current to a first charging coil in a surface of the wireless charging device, determine that an impedance of a resonant circuit has varied from a threshold or setpoint impedance, and restore the threshold or setpoint impedance by modifying frequency of the charging current. The resonant circuit may include the first charging coil.

In certain examples, the controller may couple a second charging coil to the resonant circuit, and provide the charging current to the second charging coil. The coupling of the second charging coil may modify the impedance of the resonant circuit. The controller may use a lookup table to determine the frequency of the charging current to be used after the second charging coil is coupled to the resonant circuit.

In certain examples, the controller may decouple a second charging coil from the resonant circuit. Decoupling the second charging coil may modify the impedance of the resonant circuit. The controller may use a lookup table to determine the frequency of the charging current to be used after the second charging coil is decoupled from the resonant circuit.

In one example, the impedance of the resonant circuit is modified by a change in location of a receiving device on the surface of the wireless charging device.

In certain examples, the controller may detect a change in a monitored current that flows in the resonant circuit, and may determine that the impedance of the resonant circuit has varied based on the change in the monitored current. The controller may receive a feedback signal representative of the change in the monitored current, and may control the frequency of the charging current using the feedback signal. Controlling the frequency of the charging current may include incrementally adjusting the frequency of the charging current until the impedance of the resonant circuit matches the threshold or setpoint impedance. Controlling the frequency of the charging current may include delaying modification of the frequency of the charging current.

In some examples, the storage 1406 maintains instructions and information where the instructions are configured to cause the controller to provide a charging current to a first charging coil in a surface of the wireless charging device, determine that an impedance of a resonant circuit has varied from a threshold or setpoint impedance, and restore the threshold or setpoint impedance by modifying frequency of the charging current. The resonant circuit may include the first charging coil.

In some examples, the instructions are configured to cause the controller to couple a second charging coil to the resonant circuit, and provide the charging current to the second charging coil. The coupling of the second charging coil may modify the impedance of the resonant circuit. The instructions may be configured to cause the controller to use a lookup table to determine the frequency of the charging current to be used after the second charging coil is coupled to the resonant circuit.

In some examples, the instructions are configured to cause the controller to decouple a second charging coil from the resonant circuit. Decoupling the second charging coil may modify the impedance of the resonant circuit. The controller may use a lookup table to determine the frequency of the charging current to be used after the second charging coil is decoupled from the resonant circuit.

In one example, the impedance of the resonant circuit is modified by a change in location of a receiving device on the surface of the wireless charging device.

In some examples, the instructions are configured to cause the controller to detect a change in a monitored current that flows in the resonant circuit, and determine that the impedance of the resonant circuit has varied based on the change in the monitored current. The controller may receive a feedback signal representative of the change in the monitored current, and may control the frequency of the charging current using the feedback signal. Controlling the frequency of the charging current may include incrementally adjusting the frequency of the charging current until the impedance of the resonant circuit matches the threshold or setpoint impedance. Controlling the frequency of the charging current may include delaying modification of the frequency of the charging current.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for operating a wireless charging device, comprising:
   providing a charging current to a first charging coil in a surface of the wireless charging device;
   determining that an impedance of a resonant circuit has varied from a threshold or setpoint impedance, wherein the resonant circuit includes the first charging coil; and
   restoring the threshold or setpoint impedance by modifying frequency of the charging current coupling a second charging coil to the resonant circuit; providing the charging current to the second charging coil, wherein coupling the second charging coil modifies the impedance of the resonant circuit; and using a lookup table to determine the frequency of the charging current to be used after the second charging coil is coupled to the resonant circuit.

2. The method of claim 1, further comprising:
   decoupling a second charging coil from the resonant circuit, wherein decoupling the second charging coil modifies the impedance of the resonant circuit.

3. The method of claim 2, further comprising:
   using a lookup table to determine the frequency of the charging current to be used after the second charging coil is decoupled from the resonant circuit.

4. The method of claim 1, wherein the impedance of the resonant circuit is modified by a change in location of a receiving device on the surface of the wireless charging device.

5. The method of claim 1, further comprising:
   detecting a change in a monitored current that flows in the resonant circuit; and
   determining that the impedance of the resonant circuit has varied based on the change in the monitored current.

6. The method of claim 5, further comprising:
   receiving a feedback signal representative of the change in the monitored current; and
   controlling the frequency of the charging current using the feedback signal.

7. The method of claim 5, wherein controlling the frequency of the charging current comprises:
   incrementally adjusting the frequency of the charging current until the impedance of the resonant circuit matches the threshold or setpoint impedance.

8. The method of claim 5, wherein controlling the frequency of the charging current comprises:
   delaying modification of the frequency of the charging current.

9. A wireless charging device, comprising:
   a plurality of charging cells provided on a surface of the wireless charging device; and
   a processor configured to:
      provide a charging current to a first charging coil in a surface of the wireless charging device;
      determine that an impedance of a resonant circuit has varied from a threshold or setpoint impedance, wherein the resonant circuit includes the first charging coil; and
      restore the threshold or setpoint impedance by modifying frequency of the charging current couple a second charging coil to the resonant circuit; provide the charging current to the second charging coil, wherein coupling the second charging coil modifies the impedance of the resonant circuit; and use a lookup table to determine the frequency of the charging current to be used after the second charging coil is coupled to the resonant circuit.

10. The wireless charging device of claim 9, wherein the processor is configured to:
    decouple a second charging coil from the resonant circuit, wherein decoupling the second charging coil modifies the impedance of the resonant circuit.

11. The wireless charging device of claim 10, wherein the processor is configured to:
    use a lookup table to determine the frequency of the charging current to be used after the second charging coil is decoupled from the resonant circuit.

12. The wireless charging device of claim 9, wherein impedance of the resonant circuit is modified by a change in location of a receiving device on the surface of the wireless charging device.

13. The wireless charging device of claim 9, wherein the processor is configured to:
    detect a change in a monitored current that flows in the resonant circuit; and
    determine that the impedance of the resonant circuit has varied based on the change in the monitored current.

14. The wireless charging device of claim 13, wherein the processor is configured to:
    receive a feedback signal representative of the change in the monitored current; and
    control the frequency of the charging current using the feedback signal.

15. The wireless charging device of claim 13, wherein the processor is configured to:
    incrementally adjust the frequency of the charging current until the impedance of the resonant circuit matches the threshold or setpoint impedance.

16. The wireless charging device of claim 13, wherein the processor is configured to:

delay modification of the frequency of the charging current.

* * * * *